United States Patent
Chiang et al.

[11] Patent Number: 5,242,060
[45] Date of Patent: Sep. 7, 1993

[54] HOLDER MOUNTED ON A VERTICAL WALL FOR HOLDING A WOK-COVER

[76] Inventors: Chao-Cheng Chiang; Jyh-Yun Dhnq, both of Fl. 5-2, No. 455, Chung-Cheng Rd., Yung-Ho City, Taipei Hsien, Taiwan

[21] Appl. No.: 854,882

[22] Filed: Mar. 20, 1992

[51] Int. Cl.$^5$ .............................................. A47G 19/08
[52] U.S. Cl. ........................................ 211/41; 211/13; 248/309.1
[58] Field of Search ............ 248/153, 175, 302, 309.1, 248/176, 311.2; 211/13, 41, 87, 89, 88

[56] References Cited

U.S. PATENT DOCUMENTS

| | | | |
|---|---|---|---|
| 887,972 | 5/1908 | Sloan | 211/41 X |
| 1,667,266 | 4/1928 | Papp | 211/41 |
| 2,494,488 | 1/1950 | Pfeil | 211/32 |
| 2,633,994 | 4/1953 | Brown | 211/41 |
| 4,776,469 | 10/1988 | Geleziunas et al. | 211/88 X |
| 4,790,503 | 12/1988 | Pohler | 211/41 X |
| 4,911,310 | 3/1990 | Raishe | 211/87 |
| 4,998,627 | 3/1991 | Elder | 211/87 X |

*Primary Examiner*—J. Franklin Foss
*Attorney, Agent, or Firm*—Cushman, Darby & Cushman

[57] ABSTRACT

A flat base mounted on a vertical wall has a supporting unit defining a receiving space to hold a wok-cover therein. The supporting unit also includes a receptacle provided at a lowest portion of the receiving space into which water from the wok-cover flow down.

4 Claims, 6 Drawing Sheets

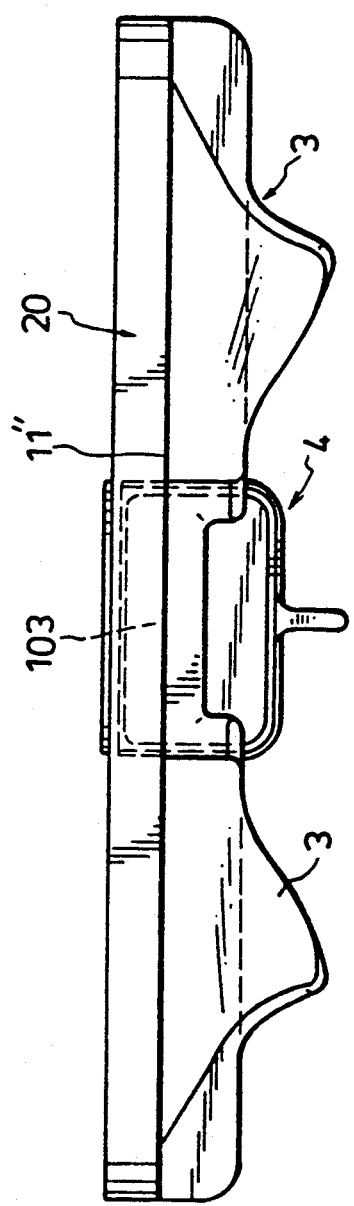
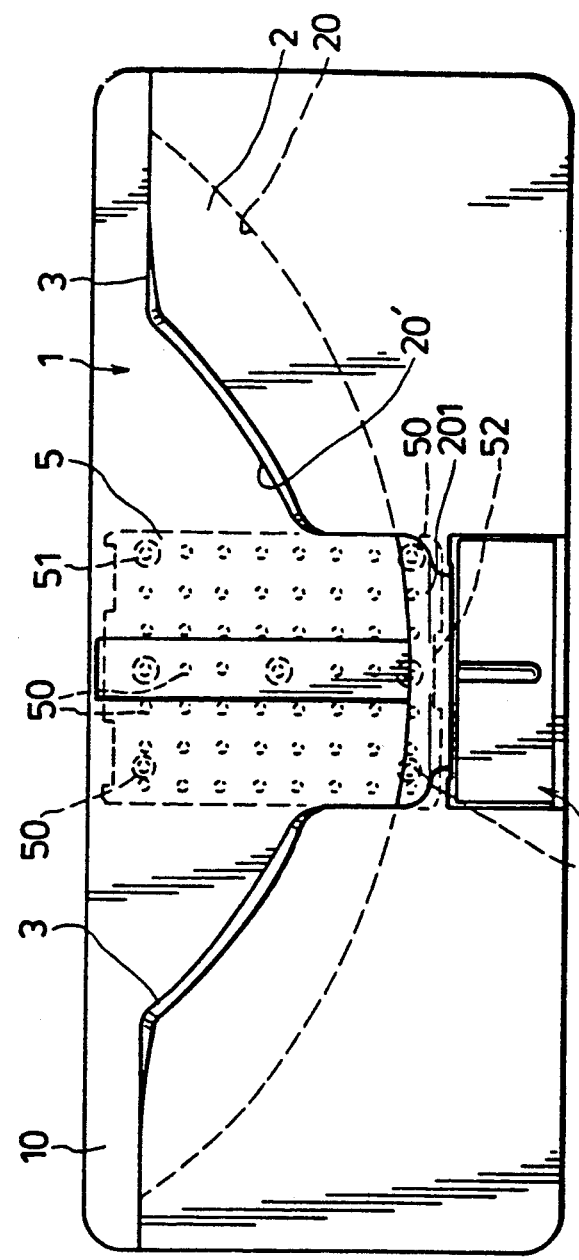
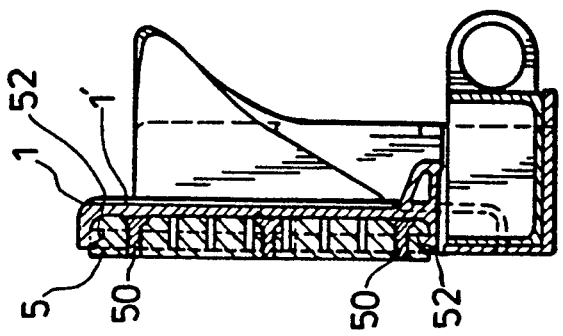

though room is often limited in a kitchen, as long as there is a vertical wall, the holder of the present invention can be mounted thereon so as to save the space of a kitchen.

HOLDER MOUNTED ON A VERTICAL WALL FOR HOLDING A WOK-COVER

BACKGROUND OF THE INVENTION

1. Field of Invention

This invention relates to a holder, more particularly to a holder mounted on a vertical wall for holding wok-covers of different sizes and shapes.

2. Description of the Related Art

When cooking with a wok, a wok-cover is used to cover the same so as to quicken the cooking or to make the food more delicious. The problem with the wok-cover is that, when it is removed from the wok, one can not always locate a proper place to put the wok-cover, which will be used again after some time. If one leaves it at any place in the kitchen, it becomes an obstacle in the kitchen, where room is often limited. In addition, water condensed from the steam inside of the wok-cover will drop on the floor, thereby soiling the kitchen.

There are already several kinds of wok-cover holders invented for use in a kitchen, but each can only hold a wok-cover of a particular type and does not contain a receptacle for receiving the condensation which flows down from the wok-cover.

SUMMARY OF THE INVENTION

A main object of the present invention is to provide a holder mounted on a vertical wall for holding a wok-cover.

Another object of the present invention is to provide a holder for a wok-cover, having a receiving means for receiving the condensation flowing down from the wok-cover.

According to the present invention, the holder is to be mounted on a vertical wall, and it includes a receiving space formed in such a manner to receive wok-covers of differing shapes and sizes. The receiving space has a lowest portion having a receptacle so that the condensation of steam into water on the inner surface of the wok-cover will flow down into the receptacle.

BRIEF DESCRIPTION OF THE DRAWINGS

Other features and advantages of the present invention will become apparent in the following detailed description, including drawings, all of which show a non-limiting form of the present invention, and in which:

FIG. 3 (A) shows a front view of the holder of the present invention;

FIG. 3 (B) shows a side view of the holder of the present

FIG. 3 (C) shows a top view of the holder of the present invention;

FIG. 4 (B) shows a side view of the holder of the present invention holding a wok-cover of another type.

DETAILED DESCRIPTION OF THE PREFERRED EMBODIMENT

Figure 1A:
FIG. 1, (A), (B), . . . , (H) show a plurality of wok-covers to be held by a holder of the present invention.
Figure 1B:
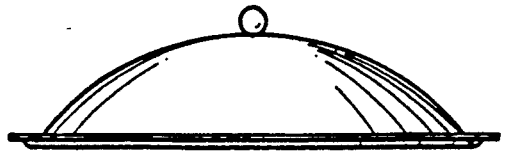
Figure 1C:
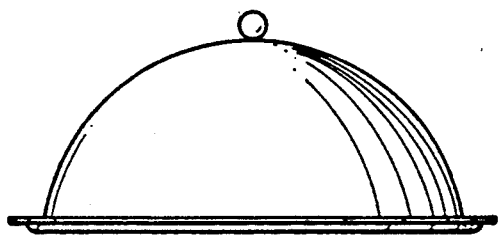
Figure 1D:
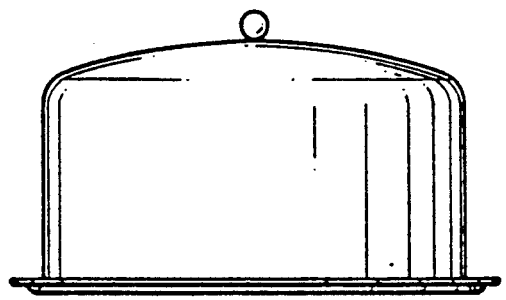
Figure 1E:
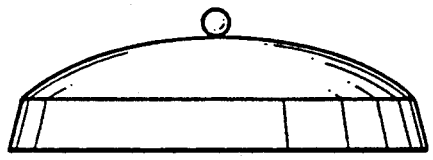
Figure 1F:
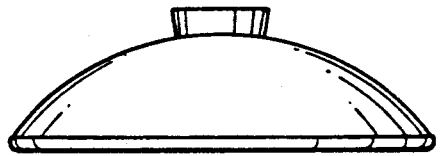
Figure 1G:
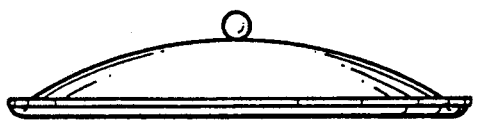
Figure 1H:
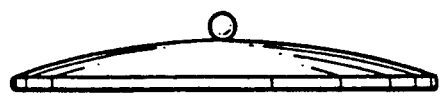
Figure 2:
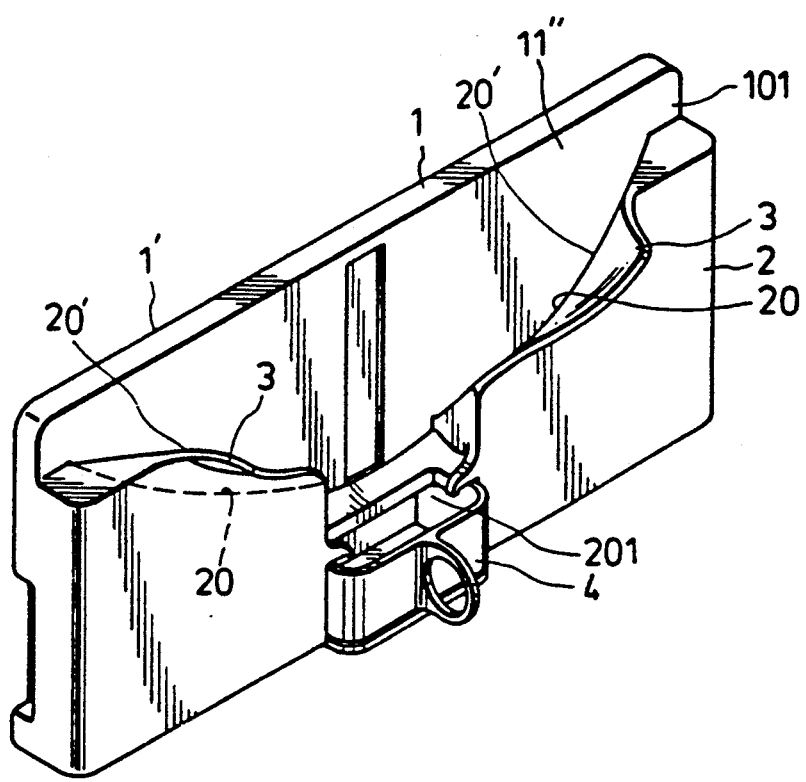
FIG. 2 shows a perspective, schematic view of a holder of the present invention.

Referring to FIG. 2, a holder according to the present invention for holding a wok-cover is shown to comprise a flat base (1) having a top portion, a rear face to be abutted against a vertical wall (not shown), and a front face (11"), and two first opposite side ends (101). The support means (2) can be of any shape, but in the preferred embodiment, it is configured to the flat base (1) for easy understanding. The support means (2) is mounted on the front face (11"), defining a receiving space between the front face (11") and the support means (2) so that a wok cover can be kept therein.

Referring to FIGS. 3 (A) and 3 (B), a plate (5) having a plurality of mounting holes (50) therethrough is fixed on the vertical wall, and the rear face (1') of the flat base (1) is screw-fastened (51) to the plate (5). The plate (5) can be mounted on the vertical wall in any manner so long as it can hold the holder of the present invention.

The support means (2) includes a top supporting edge (20') lower than the top portion of the flat base (1) and has two second opposite side ends respectively adjacent to the two first opposite side ends (101). The top supporting edge (20') gradually concaves downward and inward from the two second opposite side ends. In the preferred embodiment, it has an arc-shape rear end (20) in contact with the front face (11"). The receiving space is formed upward of the arc-shaped rear end. The top supporting edge (20') has a lowest portion at which a notch (201) is cut so that the notch (201) is in communication with the receiving space. A receptacle (4) is detachably provided adjacent to the notch (201) and is lower than the lowest portion of the supporting edge (20').

An important aspect of the present invention is that the receiving space is adapted to receive a variety of wok-cover of different sizes and shapes as shown in FIG. 1. This feature results from the fact that the top supporting edge (20') further has a flared flange (3) projecting upward and forward from the arc-shaped rear end (20), thus enlarging the receiving space formed between the support means (2) and the front face (11") of the flat base (1).

Figure 4B:
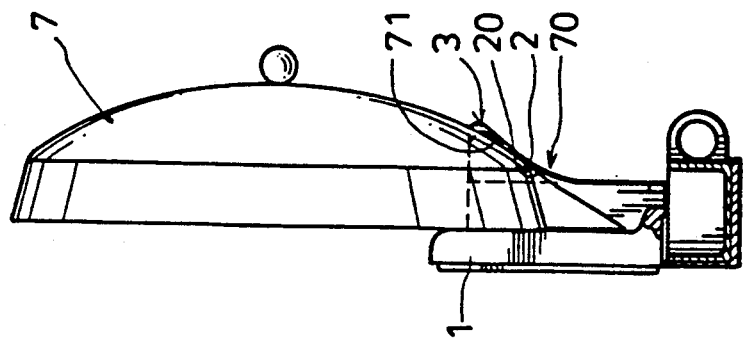
FIG. 4 (A) shows a side view of the holder of the present invention holding a wok-cover.
Figure 4A:
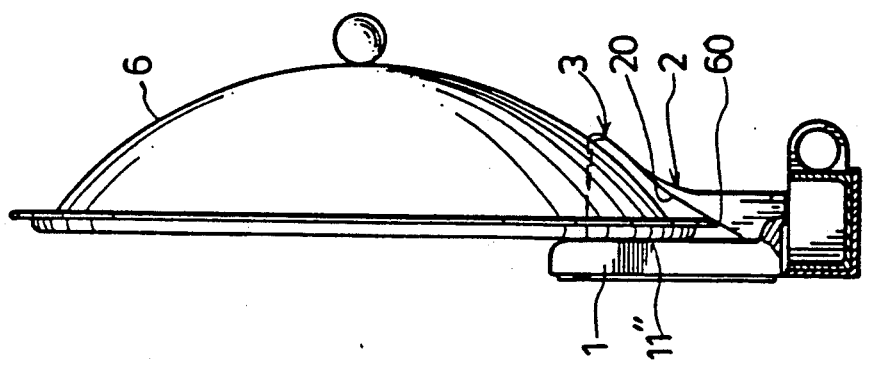
Figure 5:
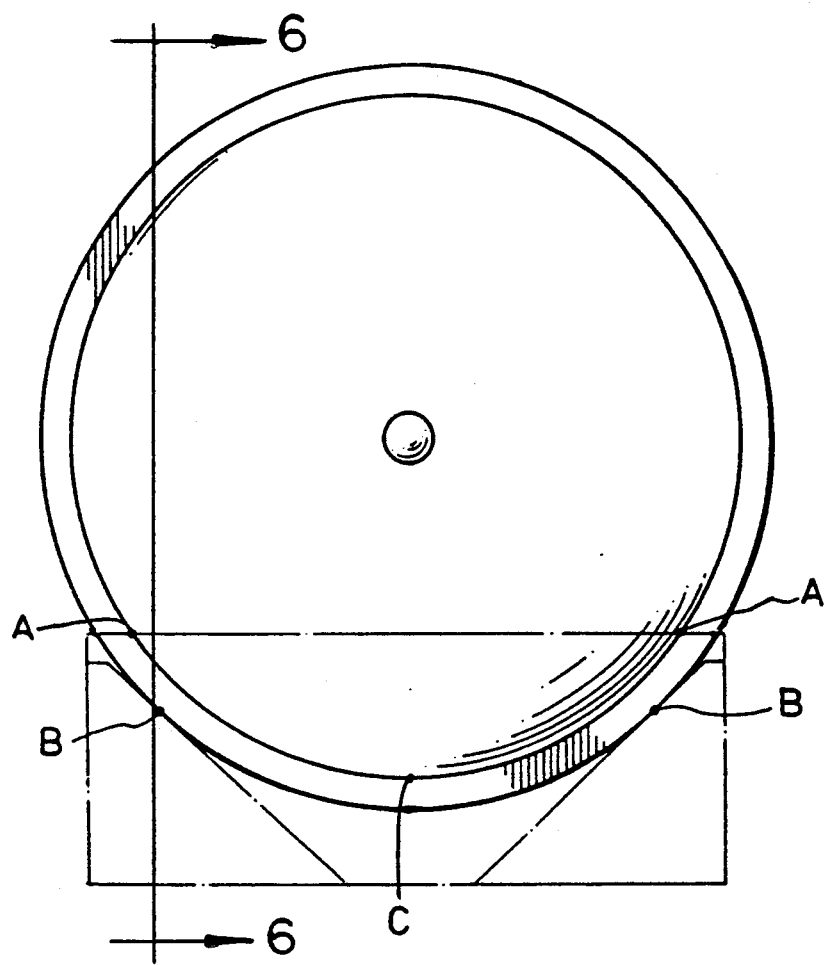
FIG. 5 shows a front view of the holder of FIG. 4 (B).
Figure 6:
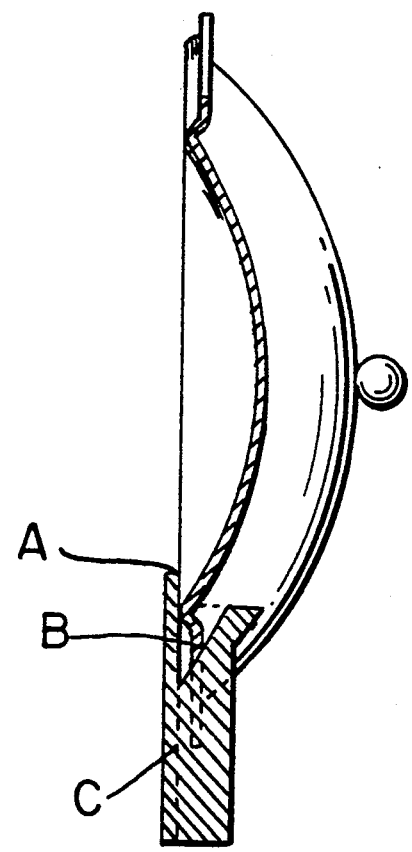
FIG. 6 shows a side view of the holder of FIG. 5.

Referring to FIGS. 4 (A) and 4 (B), two differing wok-covers (6,7) are received in the receiving space of the holder of the present invention. Though the wok-cover has a different shape, an edge (60) of the wok-cover (6) is sandwiched between the front face (11") of the flat base (1) and the inwardly concaved rear end (20) of the top supporting edge (20'). In case the wok-cover (7) is shaped as shown in FIG. 4 (B), the wok-cover (7) is supported at (70) and (71) by the inwardly concaved rear end (20) of the top supporting edge (20") and the flared flange (3), enabling the wok-cover to stay therein in a stable condition. FIGS. 5 and 6 show front and side views of the holder illustrated in FIG. 4 (B) where A, B and C illustrate the contact places of the wok-cover with the holder of the present invention.

The holder of the present invention has a substantially V shape when in cross section. The arc-shaped rear end (20) in contact with the front face (11") forms an inclined channel in cooperation with the front face (11") so that when the wok-cover is pleased in the holder, steam condensed into water on the inner surface of the wok-cover flows down from the inclined channel into the receptacle (4). Thus, soiling of a kitchen can be avoided by the use of the holder of the present invention.

With the invention thus explained, it is obvious to those skilled in the art that many changes and arrangements can be made without departing from the scope and spirit of the present invention. It is therefore intended that the invention not be limited to the exact disclosure.

We claim:

1. A wok-cover holder for a vertical wall, comprising:
   a flat base having a rear face to be abutted against said vertical wall, a front face and two first opposite ends;
   a support member provided on said front face and defining a receiving space between said flat base and said support member to receive said wok-cover, said support member having a top supporting edge and a lower rear edge abutting the front face, said top supporting edge being flush against the front face near the two first opposite ends and extending arcuately downward and inward relative to the two first opposite ends, said lower rear edge extending arcuately along the front face between the two first opposite ends.

2. A wok-cover holder as claimed in claim 1, wherein said flat base further includes a top portion; and
   said support member is configured to said flat base and includes a top supporting edge lower than said top portion of said flat base, said top support edge having two second opposite side ends adjacent to said first opposite side ends and gradually concaved downward and inward from said two second opposite side ends.

3. A wok-cover holder as claimed in claim 1, wherein said top supporting edge has a substantially arc-shaped lower rear edge in contact with aid front face; and
   said receiving space has a lowest portion thereof, said top supporting edge further including a stop portion projecting upward and forward from said arc-shaped lower rear edge, said stop portion including a notch formed adjacent to said lowest portion of said receiving space.

4. A holder as claimed in claim 2, wherein said stop includes a pair of upwardly and forwardly flared flanges formed on two sides of said notch; and
   said support member further includes a receptacle detachably provided adjacent to said notch and being lower than said lowest portion of said receiving space.

* * * * *